(12) United States Patent
Randle et al.

(10) Patent No.: US 7,546,276 B2
(45) Date of Patent: Jun. 9, 2009

(54) COMMON AUTHENTICATION SERVICE FOR NETWORK CONNECTED APPLICATIONS, DEVICES, USERS, AND WEB SERVICES

(76) Inventors: William M. Randle, 2839 Bryden Rd., Bexley, OH (US) 43209; Randall E. Orkis, 2726 State Rout 310 N., Pataskala, OH (US) 43062

(*) Notice: Subject to any disclaimer, the term of this patent is extended or adjusted under 35 U.S.C. 154(b) by 434 days.

(21) Appl. No.: 11/337,394

(22) Filed: Jan. 23, 2006

(65) Prior Publication Data
US 2007/0186103 A1    Aug. 9, 2007

(51) Int. Cl.
*G06F 17/60*    (2006.01)
(52) U.S. Cl. .......................................... 705/65
(58) Field of Classification Search ................ 705/65
See application file for complete search history.

(56) References Cited

U.S. PATENT DOCUMENTS

2005/0223080 A1 * 10/2005 Gray ........................... 709/213

FOREIGN PATENT DOCUMENTS

JP       2007058270 A  *  3/2007

* cited by examiner

*Primary Examiner*—Pierre E Elisca
(74) *Attorney, Agent, or Firm*—Edwin M. Baranowski; Porter Wright Morris & Arthur LLP

(57) ABSTRACT

System architecture for network connected applications, devices, users, and web services providing security effected by means for managing interaction with an authentication library that effects a correlation between the use and creation of library entries having predetermined correlation indicia for effecting strong authentication of users and participants within the network. A common authentication service (CAS) based upon an XML or web services protocol is described.

18 Claims, 6 Drawing Sheets

Authentication Library Creation Process Model

- Use ID and password
- Secure ID
- Terminal ID
- Network logon
- Device ID
- Device + User Credential + Service Requested
- Device + User Credential + Application
- Service URL and Digital Certification
- SAML String
- XML String
- Mail
- Human challenge
- IFX / XML service string
- RFID
- Wireless ID
- Biometric (voice, fingerprint, retina / iris, weight, height... etc)
- ......etc SV = Strength Value for each Authentication Library Entry

COMMON AUTHENTICATION SERVICE FOR NETWORK CONNECTED APPLICATIONS, DEVICES, USERS, AND WEB SERVICES

RELATED APPLICATIONS

This application refers to by reference co-pending applications in which we are co-inventors: Dialect Independent Multi-Dimensional Integrator Using a Normalized Language Platform and Secure Controlled Access, Ser. No. 10/283,038, filed on Oct. 25, 2002; Standardized Transmission and Exchange of Data With Security and Non-Repudiation Functions, Ser. No. 10/459,694 filed on Jun. 11, 2003; Quality Assured Secure and Coordinated Transmission of Separate Image and Data Records Representing a Transaction, Ser. No. 10/823,442, filed on Apr. 12, 2004; End to End Check Processing From Capture to Settlement With Security and Quality Assurance, Ser. No. 10/846,114, filed on May 15, 2004; Secure Service Network and User Gateway, Ser. No. 10/967,991, filed on Oct. 18, 2004; and Secure Service Network and User Gateway, Ser. No. 11/154,033, filed on Jun. 15, 2005.

The above identified applications relate to architecture referred to generally as a secure service network (SSN) and are incorporated by reference as if set out in full herein.

BACKGROUND AND SUMMARY OF THE INVENTION

The above applications relate generally to secure commerce over a networked community where security is a critical component. Specifically the security component around authentication has been a challenge to address with the masses due to the need to balance stronger authentication with the need for portability, low cost, human engineering, and ease of use. Many approaches to strong authentication are intrusive to the user, costly to implement and manage, limited in portability, and limited in functionality. Some examples include the popular secure ID (by RSA) approach to two factor authentication, the token approach (local or device driven), or many recently announced heuristic techniques using both customer activity and forensics associated with the device or computer and the network to which it is attached.

The present application relates to a common authentication service (CAS) incorporating an authentication library model, an authentication library selection criteria, and usage correlation for strong self service authentication over network connected applications, devices, users, and web services.

There is a market need for a unique authentication approach that addresses the requirement for strong authentication at any self service devices while reducing the threat posed by many common attacks. At self service channels a human dialog can not take place where a challenge can be made using data unique to the caller and relationship. In addition, at attended channels a mechanism is needed where data created and used for authentication is isolated from access by participants.

Some common attacks include Phishing (via email or spoofed web site), key board loggers, and man in the middle attacks as well as internal fraud. Current approaches are either limited in their ability to counter common attacks, are costly, labor intensive, limited in portability, or place unacceptable burden on the user. The solution of the invention addresses this need by establishing a unique authentication process as a multi-factor authentication mechanism that is easy for the user, low cost to implement and support, highly reliable, easily integrated with current systems, and flexible.

Current government mandates for stronger authentication for web based access are pushing this issue and posing challenges to current market available multi-factor approaches. Current solutions are costly and difficult to manage across millions of users, and multi-device/application environments. An example of the need is the recent government announcement requiring banks to establish stronger authentication models for internet baking customers. Current approaches are lacking in many areas. For example many of the common two factor token based approaches are expensive and intrusive to the users. In addition, using a token or secret stored on a machine or device often limits portability and can have significant deployment and support costs.

Threats to this group of users include both direct and indirect attacks. As a result there is a need for a strong flexible authentication approach to address this need that can be used at self service channels as well as agent attended channels.

This invention is applicable to any electronic interface where strong user/device or participant authentication is needed. The invention is a specific example of the security service described in previous applications mentioned earlier by applying a common security service for strong authentication. The invention brings automated customer centric strong authentication to all customer interaction points with a specific focus on self service interaction points and devices. Exposed as a service, the invention can be used at many different devices, interaction points, users, where the behavior of the service adjusts to the specifics of the authorization activity. Selections from the authentication library can be tailored to the request and subsequent responses to one or more authentication challenges and can maintain correlation between the creation of an authentication challenge and its use at a self service or attended channel. This feature assists in addressing internal and external fraud unlike any other approach available today by assuring that information may not be compromised by the initialization process or the attended channel agent.

In one example the invention is a significant enhancement to an approach that has been in use at agent attended customer interaction points for years. For example, in a call center, the caller is often challenged by the customer service agent with information that is unique to the caller, caller's account, or other specific information not readily known to someone other than the caller and the call center agent. This provides a level of assurance that the caller is who they say they are and is not something that can be easily spoofed or intercepted and used to impersonate the customer. A growing problem even with this approach is the need to assure the challenge data is unique to the parties of the transaction and it is tracked and managed specific the authentication process and business compliance needs. Often Social Security Number, date of birth, place of birth . . . etc. are used. With the proliferation of the internet and broad access to data, these challenges are proving inadequate because the information is readily available or gathered through a phishing activity. In addition, these elements are not suitable for use in self service channels and require interaction with an attendant or call center agent. Another problem with this approach is the inability to protect certain challenges from use at attended channels versus non-attended channels. The invention's ability to correlate this also combats internal fraud by assuring that attended channel customer service agents have limited or no access to self service challenges that are unique to the authenticating party. This feature of the invention allows for the use of a strength value (SV) in determining what authentication library enter to use for a given authentication activity. In this manner dynamic selection is supported from the invention.

There is a need for an authentication service where the service can be used at self service channels for strong authentication. To accomplish this the invention includes a process model to establish an authentication library and process model for the use of data from the library such that its use provides a significant enhancement to current authentication models without requiring user authentication to be device specific or the user to carry a token, bio metric reader, or key fob. For certain circumstances such measures may be combined with the invention as additions to the authentication library to provide even stronger authentication than what is possible within a single method. The advantage of a common authentication service is that it can select from many credential options based on factors that include but are no limited to device making the request, initial credential presented, request being made, risk profile of the activity, attended or self service channel, wireless or wired . . . etc. This information in combination with a authentication library and other credential stores provides a strong, cost effective, customer friendly method for authentication that counters common attacks.

The invention includes an audit trail, origination data, and history of activity for compliance reporting and for assessing the strength of a given set of authentication activities. A unique feature of the invention is the collection of data that provides for the creation and use of a SV to determine what authentication library elements are appropriate for a given authentication request or series of requests. For example, an authentication challenge that is unique to the customer and not available to a customer service agent would have a higher SV value than one that was available to a customer service agent. Likewise, by combining a user ID and password with a random selection from a user defined authentication library would provide a better SV than something common like address, maiden name, Social Security Number, amount of last transaction . . . etc.

The present invention includes a CAS and process model that allows for integration to current authentication processes.

The present invention includes a authentication library and access methods such that the compromise of a traditional credential such as user ID and password does not compromise the system or user. The present invention also includes a process model for use and creation of authentication library entries where a SV can be used to correlate what libraries are best for a given activity, device, user, access method . . . etc.

The use of a SV value provides for a unique level of audit that includes life cycle elements around the creation of the initial authentication library entries, updates or adjustments to entries, and library use at various devices and channels.

At a self service channel there is no customer service agent to challenge the user and even if there was, over something like the internet, the challenge can be intercepted, keyboard logged, or otherwise compromised without the knowledge of either the customer or the organization they are attempting to authenticate to. In addition, with attended channels a person is acting on behalf of a user and can readily leverage access to credentials or characteristics specific to the user and provider to compromise the authentication process. In self service channels authentication is a challenging proposition due to the fact that all information used for authentication is communicated over the same in band communications channel with no human dialog. Also in this approach the interaction is typically limited to a single type or user input device.

For example using a biometric or multiple passwords is a good approach but is easily defeated by a common key board logger, man in the middle attack, or internet browser Trojan horse. This is especially true in the case of a shared computer or a community device where there is limited control over the device or what is running on it. In addition, in the case of using a bio metric, there is a need to have an additional biometric reader at the terminal or device. This limits portability and adds cost. For example if you go to a device that does not have the needed bio metric reader, the solution is useless.

Another common approach is to use a two factor authentication model where the user must have a key fob that also generates a random code sequence that is only know to the holder of the fob and the device they are attempting to authenticate to. This approach provides strong authentication but is costly to deploy and support. It is also intrusive to the customer and suffers from the out of synch conditions with the random code sequence on the fob vs the system they are authenticating to. It is also quite costly to deploy, invasive to the user, and costly to support over that of the solution of the invention.

Another approach is to store something on the device that the user employs to authenticate. This may include a secret token, cookie . . . etc that is specific the device and/or user. This approach suffers from portability limitations but, in combination with the solution of the invention can be beneficial.

Event specific processing for authentication is a key feature of the invention. Events including the creation, use, and function are all factors that are considered when using and managing the authentication library and CAS.

A CAS that is automated and auditable is needed that addresses the most common threats to authentication. Currently there is no mechanism to create, track, manage, and report on multiple authentication challenges used across more than one network attached device type and/or user type for one or more applications and/or Service Oriented Architecture (SOA)/Service Oriented Network (SON) implementations.

A unique feature of the solution is that it works for any customer interaction point and more specifically the self service device where the device is connected to a network and communicates to one or more applications or devices connected to the network to effect the authentication of a user. This need is especially important for high value information. For such activities secure interaction and compliance reporting is needed such that it is consistent and specific to the user and the application, service, or device they are interacting with. In today's networked world it is difficult to correlate network packet traffic to a specific user, application, or service activity where all associated data and activities are isolated and secure from all other traffic on the network.

The Authentication Challenge Method: The basic challenge method has been used with agent attended devices, channels, applications, and interactions, like the call center and teller platform for years. It has also been used to challenge customers when they forget their password and there is a need to reset passwords for access via self service channels. The problem with current approaches to self service channel authentication is that the challenge secret and responses are readily compromised by phishing, key board logger, and Trojan attacks. In addition, the data (address, date of birth . . . etc) is often available via other methods including phishing.

A method is needed that eliminated this risk for the authentication process in self service applications. There is need to establish an automated process around the use, creation and management of an authentication library for use in authentication challenges for self service interaction points. A method is also needed that automates authentication such that it provides a strong cost effective mode of authentication that is portable, reliable, and manageable for self service interaction points including the internet. As part of a process model, a method is needed that correlates the creation, use, and lifecycle of authentication library entries and corresponding responses such that this information is considered when selecting an appropriate authentication credential from the library for a specific authentication request. In this manner a SV can be established and managed for all authentication requests independent of a specific application, network, or device. By tracking and managing the information around the creation and use of authentication credentials a SV can be utilized to select the most suitable authentication library entry for a specific authentication request.

The invention defines a strong authentication approach that can be used stand alone or combined with other authentication mechanisms to authenticate a user to a device, service, application, network and the like at any self service channel.

BRIEF DESCRIPTION OF THE DRAWINGS

The invention is described more fully in the following description of the preferred embodiment, considered in view of the drawings in which.

BEST MODE OF THE INVENTION

A highly portable strong self service authentication service and process model for network attached devices and users. The invention addresses threats previously discussed with a unique focus on market convenience, cost, human engineering, and portability. The invention builds on the previous inventions of which I am a co inventor, included herein by reference.

A CAS where data, in combination with a traditional logon procedure like user ID and password, is created and presented at the device in a manner that randomly presents one or more authentication challenges from a set of authentication library entries that are unique to the user and/or user and owner of the system the user is authenticating to where no human intervention or out of band communication is needed.

The components to the invention includes an authentication library, an authentication library creation and management process model, an authentication library selection and randomization process model, and a CAS that can be used at any self service and/or attended device, terminal, application, appliance, web service, or networked component or user. The authentication library can include information stored in external credential repositories such as LDAP, Active Directory, RACF, ACF2 . . . etc. In this manner the CAS can leverage existing repositories as well as new ones to provide stronger authentication and expand to a virtual authentication library.

A unique component of the invention is the correlation of the authentication library request with the authentication credential lifecycle and the actual authentication request. This feature provides for a stronger level of authentication that can be tracked and managed over the entire user, provider, and credential lifecycle. For example, a user created authentication library entry can be created and managed such that customer service agent can not gain access to it. Such an approach eliminates the internal fraud issues associated with a call center agent having access to such information. in addition, common data like social security number or date of birth would not be as strong as data known only to the correct user at a self service channel. An example would be the name of your dog, your favorite color, your favorite ice cream, the model of your first car, or a non logical response to a question that the user can create and control. The invention can take this into account based on the request and correlation mechanism used to process access to the authentication library. As a result of this, depending on the device an authentication request is coming from, a specific library entry may result in weak or strong authentication or a propensity for compromise.

The creation of the authentication library and its associations is a critical and unique component of the invention. Each entry in the authentication library includes at least three pieces of information for each authentication event. The first is the authentication question (Q). The second is the expected response (R). The third is a meta data table that includes information pertinent to the first two.

Meta data includes data like user, date, time, device, authentication method, self service device, attended device, owner generated, requestor generated, out of band, in band, etc. Using this meta data a SV for each entry can be established specific to an authorization request or use. in addition, the life cycle of each entry into the authentication library, the user, the provider, and the SV can be managed and audited.

Another unique feature of the invention is its ability to allow the user to create user specific library entries as well as select from a pick list. The user is required to establish at least 2 or more entries (more entries results in stronger authentication and stronger protection against attack). Once the authentication library entries are established the corresponding responses are also established. The establishment of the questions and responses may be accomplished in or out of band. Out of band usually provides a higher level of security around the challenge information for a specific use. For example, library entries created from a self service channel may be better suited for use at non attended channels than library entries created from attended channels. The challenge questions may be user defined, owner defined, authentication service defined, picked from a predefined list or any combination. Examples include: What is your favorite color? What is your favorite pie? What is your dog's name? What was the name of your first pet? What is your bothers name? . . . etc. Additional challenge questions can be created by the operator that includes things like: What was the value of your last transaction? How long have you been a customer? In this manner authentication library entries can be tailored to a specific need and accessed dynamically depending on the level of authentication needed or risk profile of the activity. In addition, CAS can access data in external systems as elements of the authentication library. This may include background data, existing credential repositories, and external repositories (RACF, ACF2, LDAP, OLDAP, AD, SAML, PKI, XML Certs, PKI . . . etc.).

As part of the authentication library creation process all library questions can be screened and accepted or rejected based on a predefined set of preferences. In the case of access to existing repositories an authentication library entry can be created that correlates to a specific external credential use. This allows for the use of the invention with no changes to existing credential stores.

Once the authentication library is established the selection criteria must be established. A unique feature of the invention is the ability to select a entry from the authentication library using many variables including but not limited to: 1) random selection; 2) random selection assuring no previous challenge under the current session is repeated within a certain number of attempts or authentications at a specific channel, channel type or access path; 3) selection based on input variables including device, network address, user ID and password, historical activity, time of day, geographical location, requested activity, IP address, MAC address, value of the activity, risk profile, account type, activity type, network type (wireless, internet, internal network, business partner network . . . etc) and the like; 4) selection based on a combination of request parameters and the Meta Data Associated with a given authentication library entry.

In an alternate mode the owner of the device, system, or service that the user is authenticating to, has the option to create one or more challenge questions and responses based on data known to both the provider and user but not established by the user. In this manner the provider might have a predefined set of challenges the user can use to initialize new entries or enrollment.

The invention provides a service and process model where one or more challenges are selected from a authentication library that includes multiple challenges and response data elements. The library may be in a single location or the result of a combination of data indices from other internal or external systems.

A key component of the invention is the application of one or more unique selection criteria for determining the selection and sequencing of entries from the authentication library. The selection criteria process establishes a subset of the available entries in the authentication library for use at a particular device, user, or for a specific activity. As part of the authentication process, the entry presented for authentication is a subset of the total possible entries contained in the authentication library. This approach allows for the authentication service to be tailored to the level of strength needed for a specific activity and to the threat expected from the type of requestor.

In an alternate configuration the selection criteria can be further randomized by selecting the next library entry based on the response to the preceding one and/or the SV. In this manner stronger authentication can be implemented that is adjusted on the fly specific to a particular set of activities and interactions with the customer, network, and device used by the authenticating party and the provider.

In the case of a web based presentation device, the authentication challenge can be presented as a bit map or other random digital scheme rather than a machine interpretable character stream like html, ascii characters, WSDL, or XML. By doing this, a greater level of security is provided to address the common Trojan horse, man in the middle, or keyboard logger attacks. In these attacks the perpetrator must correlate the authentication challenge with the appropriate key board or user input response. By encoding the authentication challenge as a bit map image on the screen automated machine correlation becomes extremely difficult and would most likely require user interpretation.

Once created, a mechanism must be used to correlate an authenticating party request to an authentication library entry and specific library selection criteria. A wide range of variables, credentials, activities, can be used to accomplish this. Examples include: user ID and password, secure ID, terminal ID, network logon, device ID, device+user credential+service requested, device+user credential+application, service URL and digital certification, SAML string, XML string or certificate, IFX/XML service string, RFID, wireless ID, PKI key, digital certificate, IP address and/or subnet, MAC address, biometric (voice, fingerprint, retina/iris, weight, height . . . etc), and many others.

Any combination of the above elements can be used to correlate a request to an authentication library entry as well as to establish the unique selection criteria for authenticating against the authentication library for multi stage authentication.

In a specific application, the invention can be combined with current authentication repositories to provide an additional method of multi-factor authentication for existing systems. This allows for the solution of the invention to provide for multifactor authentication mechanism to existing systems that is counters common attacks.

One time password generation technique for existing systems using CAS and a one time password service. Using the CAS and a successful validated user authentication, a one time password can be generated for the CAS authenticated user that grants specific authentication to one or more systems out of band of CAS. The use of a one time password with CAS provides for a multi-factor authentication mechanism. The CAS authorized user can use the one time password to authenticate to any in or out of band system as defined in the configuration of the invention. When the user applies the one time password to the system the authentication process checks the one time password to assure that it is a valid authentication credential by validating the password presented to the one generated by CAS and presented to the CAS authenticated user. The link between the solution of the invention and the alternate system might be a web service, LDAP, a Radius Server, a SAML server and the like.

By leveraging the CAS and authentication library the solution of the invention augments authentication in existing systems with minimal impact. In the one time password mode the solution of the invention includes an option time limit that lets the user set the time period for which a one time password is valid. So not only is the password limited to one use but the password can have a limited life time. For example a one time password may be generated and only valid of 1, 5, or 10 minutes. The user can set this life time. It could be minutes, hours, days . . . etc.

EXAMPLE 1

Figure 1:
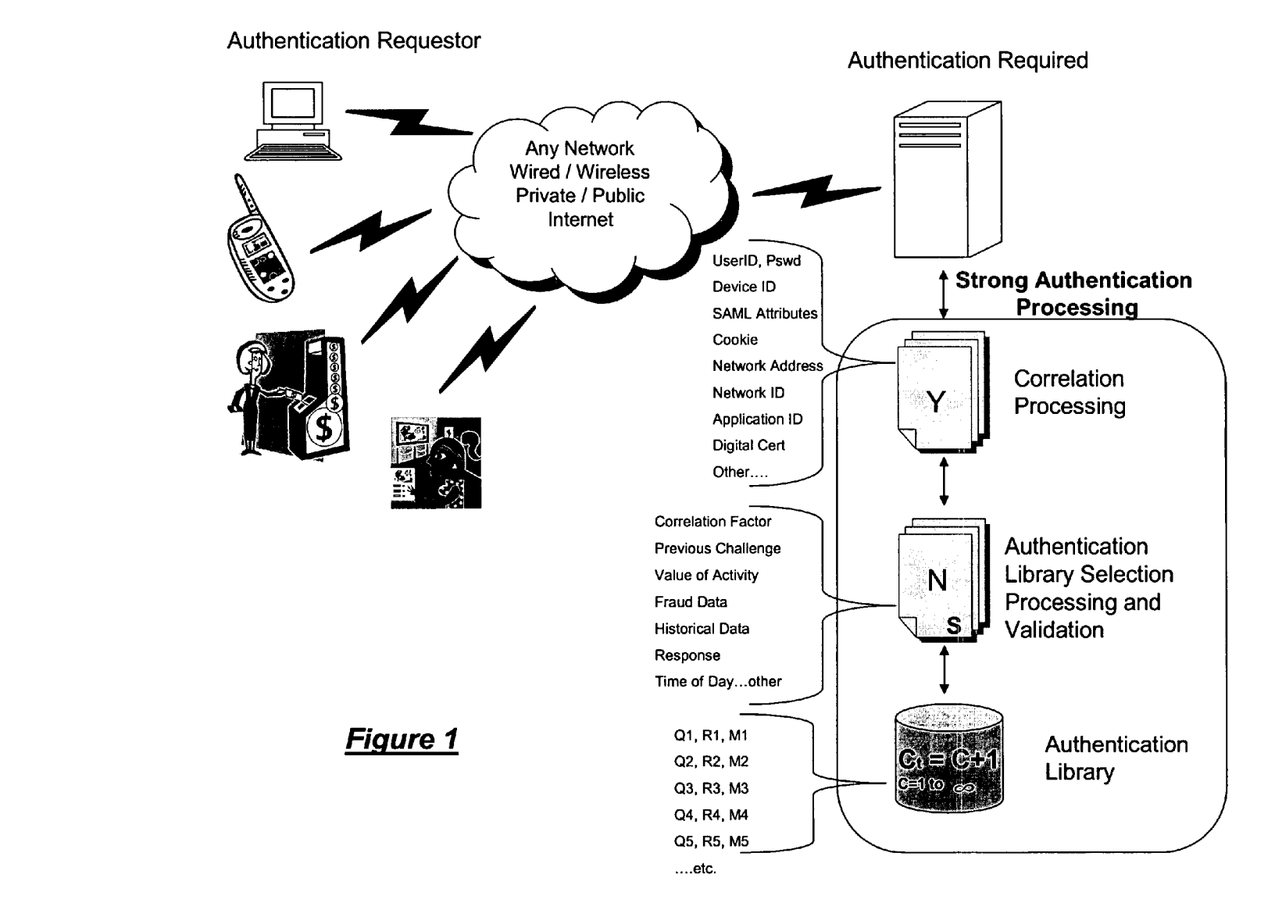
FIG. 1 shows the system of the invention in which the authentication function is provided as a mechanism to support strong authentication to a self service device connected to an application or function over a network or network community.

With reference to the drawing figures, FIG. 1 shows the system of the invention in which the authentication function is provided as a mechanism to support strong authentication to a self service device connected to an application or function over a network or network community. Traditional self service devices include the ATM, kiosk, cell phone, and laptop or desktop computers in a wired or wireless mode. The network may be wired, wireless or any mix of both including private and public networks including the internet. In the figure the user or combination of user and device provided information is presented by the device to the application requiring authentication. The device sends the request for authentication over the network to a system connected to the network that requires authentication. The information provided is used to identify one or more indices for establishing correlation processing (Y). Correlation processing is used to define one or more indices for Authentication library selection and validation processing (N). For each N there is a sequence of 1 (C) or more authentication library entries selected from (C+1) or more authentication library entries. The number of authentication library choices is always greater than the number of authentication challenges presented back to the authenticating user for any given session or activity. The greater the separation between the number of authentication challenges presented versus those in the authentication library for a given N correlates to the strength of authentication provided by the solution of the invention. The combination of meta data and this separation allows for the creation of a unique SV.

For each N there is a sequence of one or more authentication library entries that are presented back to the authenticating party. Each authentication challenge has a unique question (Q1) and response (R1) specific to a given Y and N value. In addition, metadata for each C can be used as a means to enhance authorization and thwart common attacks. In this manner the authentication processing can take on an infinite number of possibilities where the decision processing and variables may or may not be known to the authenticating party. For example, the authenticating party may present a user ID and password that results in a series of authentication challenges that are asked in sequence and must be completed prior to a successful authentication. In addition to this user interaction, the N function may also be doing validation processing against variables like IP address, MAC address, user terminal ID, user digital certificate . . . etc. all of which are entries in the authentication library for a specific user or Y variable. These items are not typically known to the authenticating party. The N process uses the correlation between a series of authentication challenges and responses to determinate authentication. This process may require a series of absolute matches or invoke a correlation algorithm such that a score or risk profile is created for the activity and authentication is granted based on this score (S).

EXAMPLE 2

Figure 2:
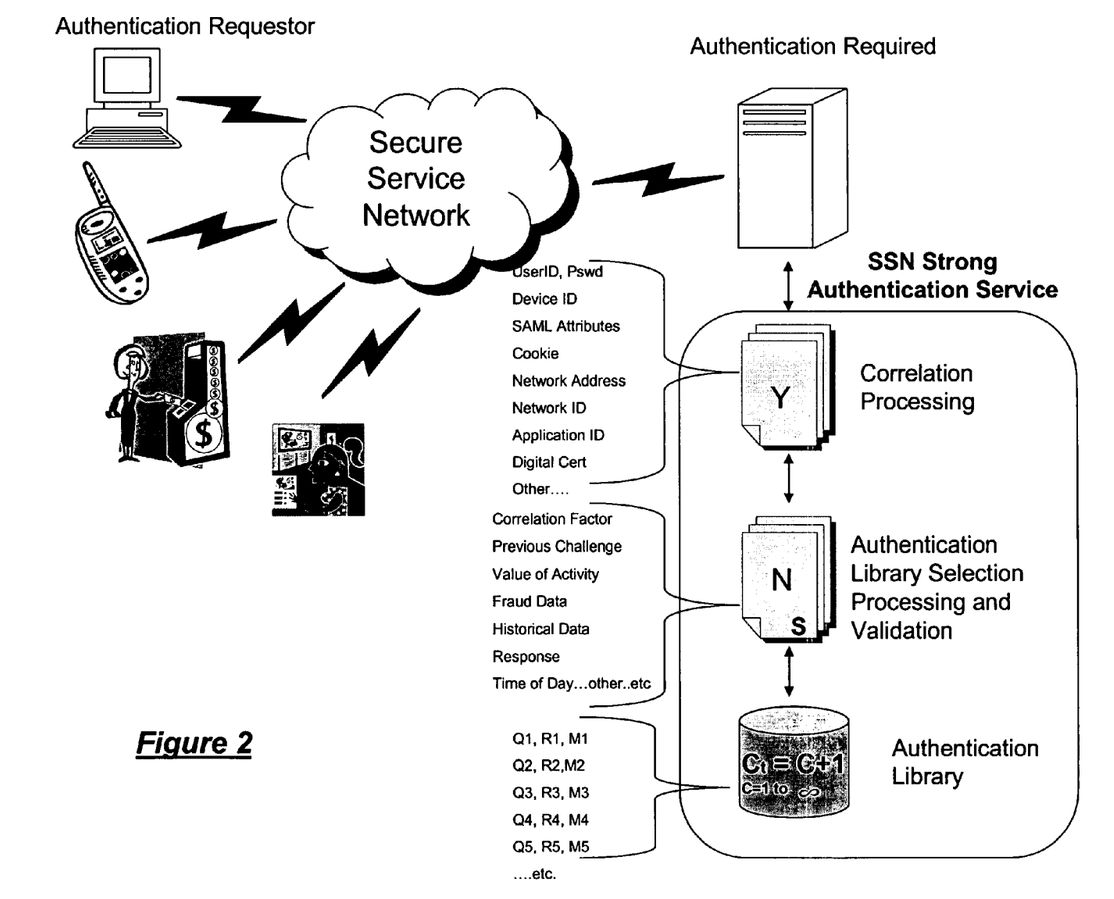
FIG. 2 shows the system of the invention in which an authentication service is provided as a mechanism to support strong authentication to participants on an SSN implementation or service oriented network. Self service and attended devices are connected to a service network.

FIG. 2 shows the system of the invention in which an authentication service is provided as a mechanism to support strong authentication to participants on an SSN implementation or Service Oriented Network. Self service and attended devices are connected to a service network. The service network may use the system of the invention for device and user authentication. Traditional self service devices include the ATM, kiosk, cell phone, and laptop or desktop computers. The network may be wired, wireless or any mix of both including private and public networks including the internet. In the figure the user or combination of user and device provided information is presented by the device to the authentication service. The device sends the request for authentication over the network to a system connected to the network that includes or can be associated to the authentication service. The information provided is used to identify one or more indices for establishing correlation processing (Y). Correlation processing is used to define one or more indices for Authentication library selection and Challenge processing validation (N).

For each N there is a sequence of 1 (C) or more authentication library entries selected from (C+1) or more authentication library entries. The number of authentication library choices is always greater than the number of authentication challenges presented back to the authenticating user. The greater the separation between the number of authentication challenges presented versus those in the authentication library for a given N correlates to the strength of authentication provided by the solution of the invention.

Each authentication challenge has a unique question (Q1) and response (R1) specific to a given Y and N value. In this manner the authentication challenge processing can take on an infinite number of possibilities where the decision processing and variables may or may not be known to the authenticating party. For example, the authenticating party may present a user ID and password that results in a series of authentication challenges that are asked in sequence and must be completed prior to allowing a successful authentication.

In addition to this user interaction, the N function may also be doing validation processing against variables like IP address, MAC address, user terminal ID, user digital certificate, XML cert, SAML string, WSS implementation . . . etc. all of which are available to the authentication library for a specific user or Y variable. These items are not typically known to the authenticating party or user. The N process uses the correlation between a series of authentication challenges and responses to determine authentication. This process may require a series of absolute matches or invoke a correlation algorithm such that a score or risk profile is created for the activity and authentication is granted based on this Score (S). The authentication service creates a valid session key for use by other services or applications on the network. This may also include a SAML or WS-S service over SSN. In this mode transitive security that includes transitive authentication can be accomplished by the invention.

EXAMPLE 3

Figure 3:
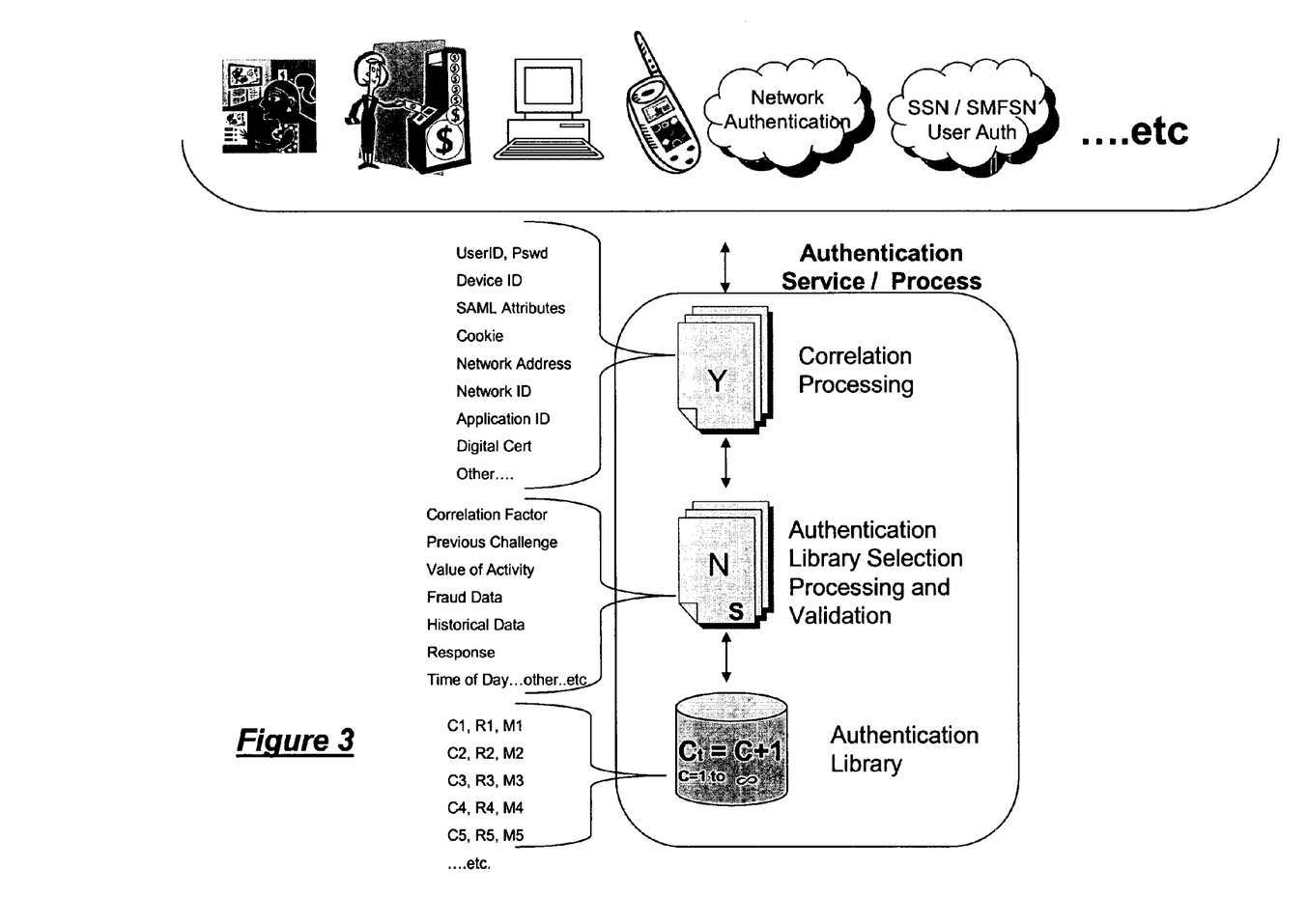
FIG. 3 shows the solution of the invention being used as a strong authentication mechanism for devices that require stand alone authentication.

FIG. 3 shows the solution of the invention being used as a strong authentication mechanism for devices that require stand alone authentication. This may include local credential stores in devices or applications as well as access control to local application or certificate repositories on a device or application. This can be accomplished for local authentication as well as networked authentication. In one implementation a networked CAS can be used to authenticate access to the local repository residing on the local machine, device, key fob, cell phone, or token. In this manner the networked CAS is available to manage authentication for local or device specific access where no other network access is needed.

EXAMPLE 4

Figure 4:
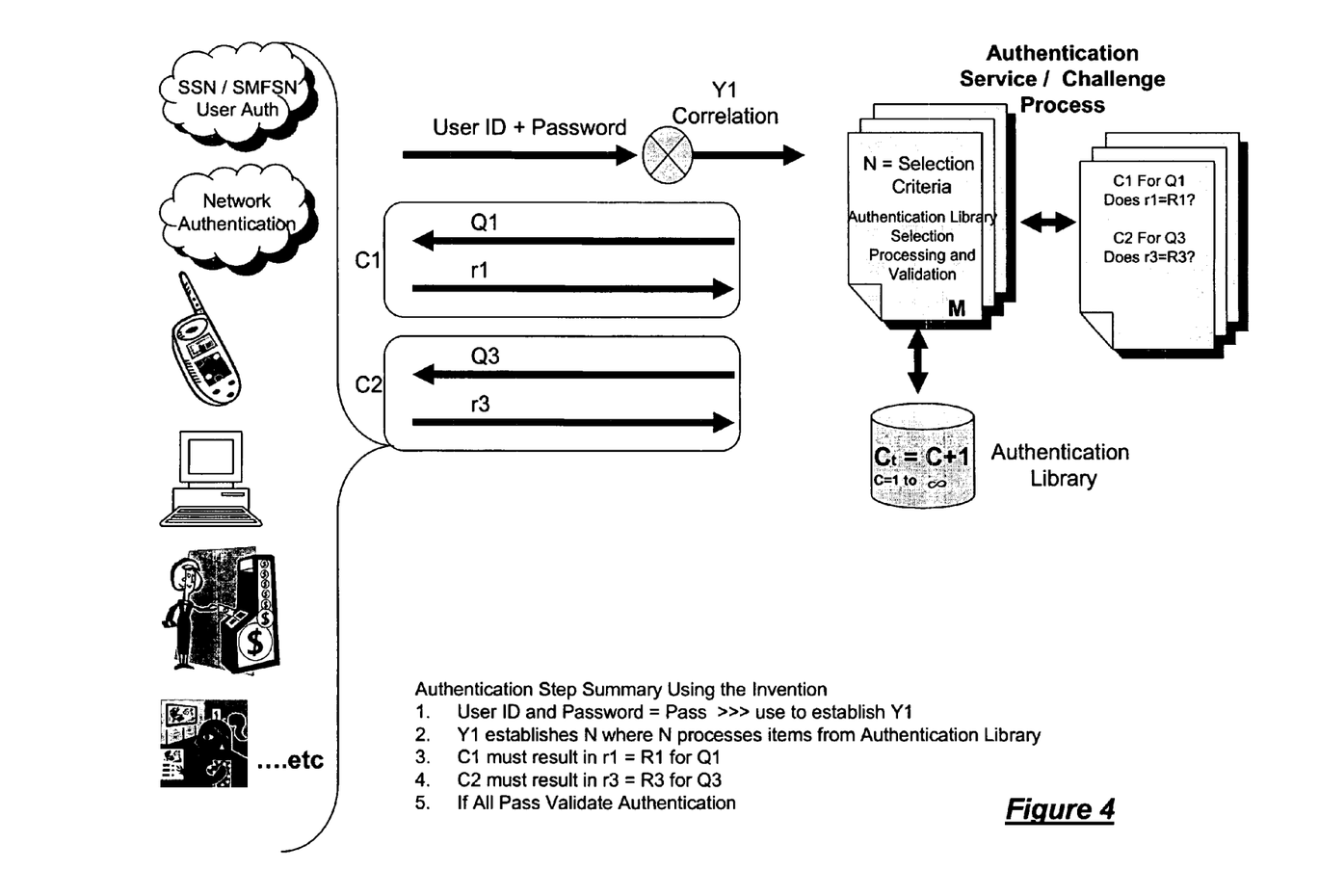
FIG. 4 shows a sample process flow for the invention where a device is requesting authentication to the invention.

FIG. 4 shows a sample process flow for the invention where a device is requesting authentication to the invention. The solution establishes a correlation K following the successful initial credential validation for the application. For an established K a resulting N (authentication library selection and processing criteria) is established specific to the request. For this specific N, C1 (Q1 R1) is presented to the requestor and following success of C1, C2 (Q3R3) is presented to the requestor. C1 and C2 may or may not include M1 and M3 as part of the N criteria.

EXAMPLE 5

Figure 5:
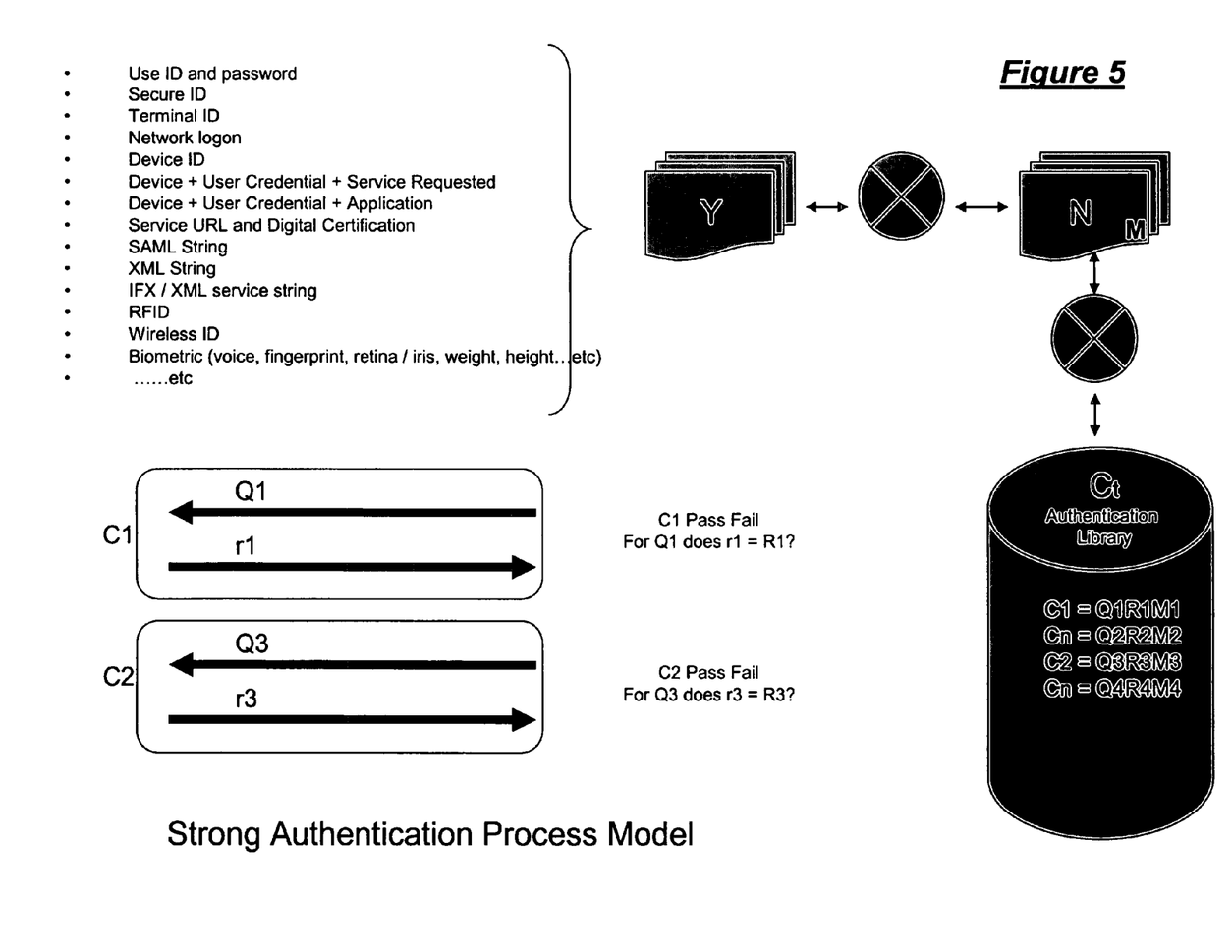
FIG. 5 shows a more detailed view of the strong authentication process model that is an element of the invention.

FIG. 5 shows a more detailed view of the Strong Authentication Process Model that is part of the invention. The invention establishes a correlation K following the successful initial credential validation for original authentication credentials. For an established K a resulting N (authentication library selection and processing criteria) is established specific to the request. For this specific N, C1 (Q1 R1) is presented to the requestor and following success of C1, C2 (Q3R3) is presented to the requestor. C1 and C2 may or may not include M1 and M3 as part of the N criteria.

In this figure an authentication request comes from a participant into the invention at Y. A wide variety of parameters may be included or associated with this request. The request enters the solution following validation of the variables contained in request. In an exception to this process no pre validation may be completed. In this case the invention does not have the benefit of pre authentication of the presented credentials.

EXAMPLE 6

Figure 6:
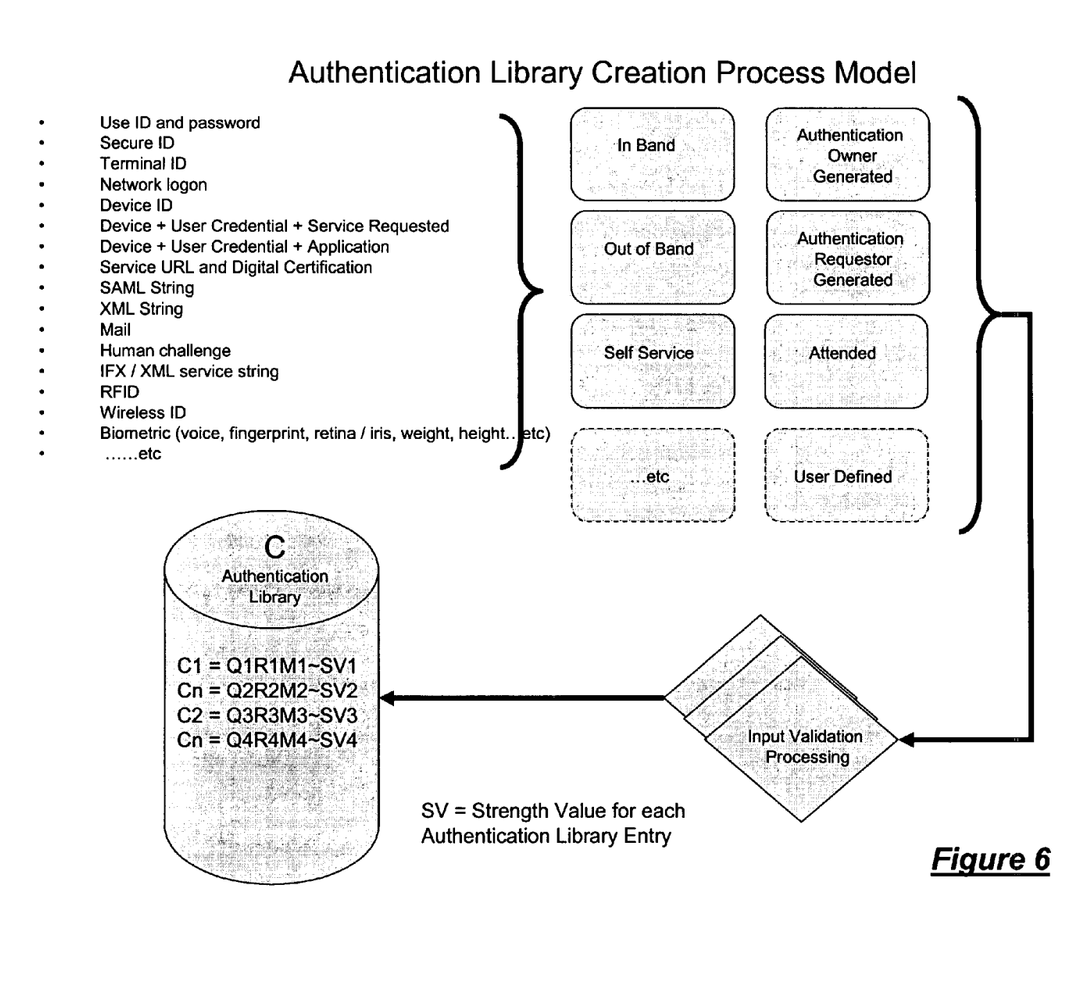
FIG. 6 is a view of the authentication library creation process model. In this figure a process flow for the creation and validation of authentication library entries is described.

FIG. 6 provides a view of the authentication library creation process model. In this figure a process flow for the creation and validation of authentication library entries is described. Six discrete variables are shown that result in the creation of Meta Data around the creation of a library entry. These include but are not limited to in band, out of band, attended device, self service device, authentication requestor generated, authentication provider generated. Many additional elements are captured and can be included as previously described. Some specific examples include: user and/or provider generation of the authentication challenges, user and/or provider generation of the responses, method for selecting a authentication challenge to be used at a specific interaction channel, method for tracking the authentication challenges and required responses such that random combinations can be created that are limited in predictability, and method for tracking the authentication challenge requests, the resulting authentication challenges and responses such that fraudulent actions can be monitored and countered in real time.

The CAS can be used for initialization of a new user or node on SSN as part of a user/self enrollment model

Having thus described the invention in detail, those skilled in the art will appreciate that, given the present disclosure, modifications may be made to the invention without departing from the spirit of the inventive concept herein described. Therefore, it is not intended that the scope of the invention be limited to the specific and preferred embodiments illustrations as described. Rather, it is intended that the scope of the invention be determined by the appended claims.

What is claimed is:

1. An authentication library for a network community comprising:

a network community;

a community service provider;

user authentication for providing access to the community comprising a) a logon for entry of user ID and password data at an access device through which a user may access a service within the community and b) a random authentication challenge issued upon completion of the log on, the challenge determined from a set of entries maintained in a library of authentication challenges specific to the user ID and the password entered by the user; the library uniquely associated with either or both of the user and the provider of the community service the user is attempting to access, each library entry including a) an authentication question; b) the expected response to the question, and c) a meta data table comprising information pertinent to the question and the response such that each library entry is specific to an authorization request and the life cycle of each library entry;

user created library credential entries having a predetermined life cycle;

a selection mechanism for determining a challenge from the library according to one or more of the following criteria a) random selection; b) random selection assuring no previous challenge under the current session is repeated within a certain number of attempts; c) input variables from the group including device, network address, user ID and password, historical activity, time of day, geographical location, requested activity, IP address, MAC address, activity value, risk profile, account type, activity type, and network type; and d) a combination of request parameters and meta data associated with a given library entry; and a correlation of the user request with the user credential lifecycle and the user authentication request.

2. An authentication library of claim 1 wherein one or more authentication library entries are used to effect multi factor authentication at in band and out of band systems.

3. An authentication library of claim 2 wherein access to the authentication library is accomplished by means of a common authentication service based upon an XML or web services protocol.

4. An authentication library of claim 3 wherein transitive security is effected among community entities connected on a network by means of the authentication service.

5. An authentication library of claim 2 wherein entries into the authentication library are created by a user via a self service interface where the user is the only one that has knowledge of the authentication library entries.

6. An authentication library of claim 2 further including a strength value (SV) protocol as an element of the authentication library wherein the SV provides a unique factor in determining suitable library entries for use in determining the authentication of one or more of a particular user, device, application, terminal, or network connection.

7. An authentication library of claim 2 including an algorithm determining the selection of entries from the library in accordance with a rule that there is no general observable correlation between multiple authentication attempts from the same device, user, or networked interface such that random authentication processes at the interface defeat keyboard loggers and in-channel security attacks.

8. An authentication library of claim 2 including a multi-factor authentication protocol applied at more than one user, device, application, or interface in a network of multiple users, devices and applications.

9. An authentication library of claim 8 wherein multifactor authentication is accomplished independent of the application, device or network interface a user is authenticating to in a networked community by using multiple entries derived from the authentication library.

10. An authentication library of claim 2 wherein a one time password is generated for use as an authentication vehicle at systems, interfaces, and devices in an application within the network community.

11. An authentication library of claim 10 further including a network link for one time password validation selected from a web service, XML service, radius server, LDAP server, meta directory, OLDAP, or SAML server in conjunction with multifactor authentication.

12. The authentication library system in accordance with claim 1 wherein 1) a service is interconnected with a device, user, or application such that the authentication process permits access to one or more entries in an authentication library for strong authentication and 2) an application specific authentication is a precondition to access to the application.

13. The system of claim 1 wherein the network comprises an ATM, kiosk, cell phone, or computer network.

14. The system of claim 13 wherein the network is wired or wireless.

15. An authentication library for a network community comprising:
- a network community;
- a community service provider;
- a web service or XML service interconnected with a device, user, or application such that an authentication process permits access to one or more entries in an authentication library for strong authentication and an application specific authentication is a precondition to access to the application;
- means for initializing a new user node within a network community to effect authentication for user self enrollment;
- user authentication for providing access to the community comprising a) a logon for entry of user ID and password data at an access device through which a user may access a service within the community and b) a random authentication challenge issued upon completion of the log on, the challenge determined from a set of entries maintained in a library of authentication challenges specific to the user ID and the password entered by the user; the library uniquely associated with either or both of the user and the provider of the community service the user is attempting to access, each library entry including a) an authentication question; b) the expected response to the question, and c) a meta data table comprising information pertinent to the question and the response such that each library entry is specific to an authorization request and the life cycle of each library entry;
- user created library credential entries having a predetermined life cycle;
- a selection mechanism for determining a challenge from the library according to one or more of the following criteria a) random selection; b) random selection assuring no previous challenge under the current session is repeated within a certain number of attempts; c) input variables from the group including device, network address, user ID and password, historical activity, time of day, geographical location, requested activity, IP address, MAC address, activity value, risk profile, account type, activity type, and network type; and d) a combination of request parameters and meta data associated with a given library entry; and
- a correlation of the user request with the user credential lifecycle and the user authentication request.

16. The library system of claim 15 including means for using authentication dynamically in combination with a library of authentication criteria entries to react to security threats in real time whereby strong authentication is required in the absence of any human interaction except for that of the authenticating user.

17. The system of claim 15 wherein the network comprises an ATM, kiosk, cell phone, or computer network.

18. The system of claim 17 wherein the network is wired or wireless.

* * * * *